United States Patent [19]
Holding et al.

[11] 3,811,570
[45] May 21, 1974

[54] POLYURETHANE SCREEN WITH BACKING MEMBER

[75] Inventors: Thomas Holding, Canton; Robert C. Schisler, Akron; John M. Sawyer, Cuyahoga Falls, all of Ohio

[73] Assignee: The Goodyear Tire & Rubber Company, Akron, Ohio

[22] Filed: May 20, 1971

[21] Appl. No.: 145,358

[52] U.S. Cl. .............................. 209/399, 210/498
[51] Int. Cl. .............................................. B07b 1/46
[58] Field of Search .......... 209/397, 399, 233, 392; 210/498, 499; 161/190

[56] References Cited
UNITED STATES PATENTS

| | | | |
|---|---|---|---|
| 1,916,393 | 7/1933 | Smith | 209/397 |
| 2,412,905 | 12/1946 | Niewwenhuis | 209/397 X |
| 2,516,102 | 7/1950 | Brant | 210/498 UX |
| 2,939,851 | 6/1960 | Orenin | 260/471 C X |
| 2,948,691 | 8/1960 | Windemuth | 260/471 C X |
| 2,904,187 | 12/1960 | Riedel | 209/399 X |
| 3,018,891 | 1/1962 | Bergstrom | 209/399 X |
| 3,483,976 | 12/1969 | Williams | 209/399 X |
| 3,133,853 | 5/1964 | Knox | 161/190 X |

FOREIGN PATENTS OR APPLICATIONS

| | | | |
|---|---|---|---|
| 108,053 | 7/1937 | Australia | 209/397 |
| 767,619 | 11/1952 | Germany | 209/233 |
| 1,912,870 | 10/1969 | Germany | 209/397 |

OTHER PUBLICATIONS
Rubber World, July 1961, page 83.

Primary Examiner—Robert Halper
Attorney, Agent, or Firm—F. W. Brunner; J. D. Wolfe

[57] ABSTRACT

An improved shaker screen having openings therein for the size particles desired, comprising a plastic or hard elastomeric member and a facing member of a polyurethane elastomer having a Shore A hardness of 30 to 90.

6 Claims, 3 Drawing Figures

PATENTED MAY 21 1974  3,811,570

POLYURETHANE SCREEN WITH BACKING MEMBER

This invention relates to an improved shaker screen and to the method of preparation. More particularly, this invention relates to vibrating screens and method of making and using same.

Shaker screens are normally made of metal by punching out holes in a metal plate where the holes may be circular, oblong or the other well-known shapes that are used in the shaker screen industry. These shaker screens are used in sizing coal, rock, ores and other solids to the desired size. In use these hard abrasive ores or rocks abrade and cause the metal shaker screens to fail very rapidly, usually in 1 to 2 months. For a number of years it has been the practice to coat these metal shaker screens with natural rubber or the synthetic rubbers. Although these rubber coatings give an improved life to the shaker screen, they normally fail within 6 to 8 months and have to be replaced at considerable expense. Also, the rubber covered metal plates present problems in getting uniform holes in the screen.

Figure 1:
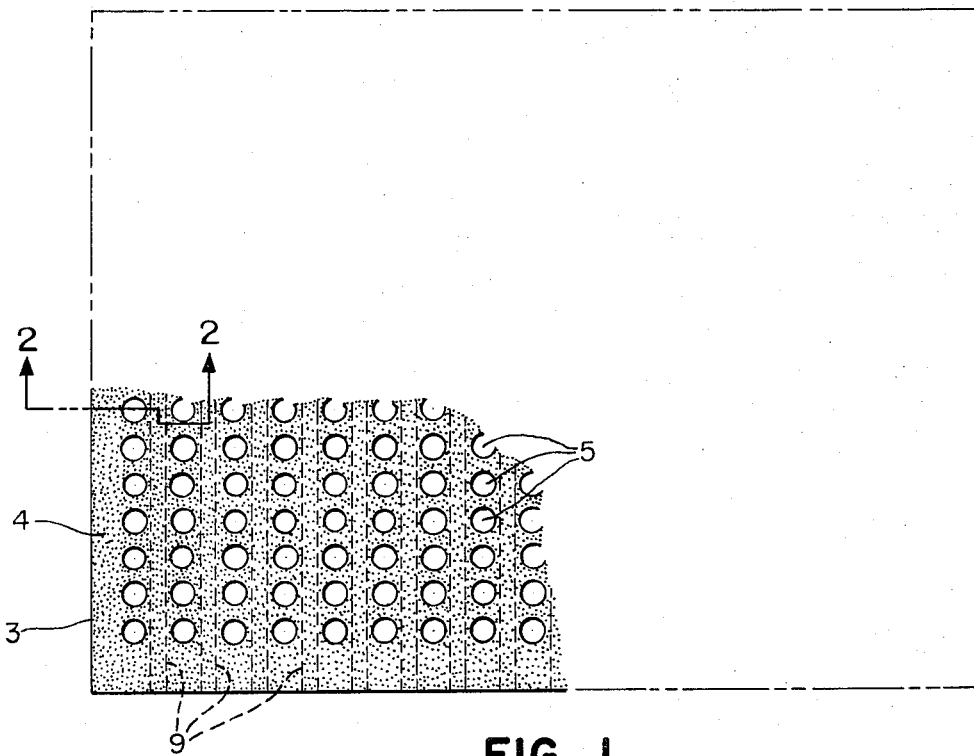

It is an object of this invention to provide a method of making an improved shaker screen. This object and other advantages of this invention may more readily be appreciated by reference to the drawings wherein FIG. 1 is a plan view of one embodiment of the shaker screen, FIG. 2 is a cross section through a part of a screen positioned in a mold used to form the screen member, and FIG. 3 is a cross section through a modified shaker screen.

Figure 2:
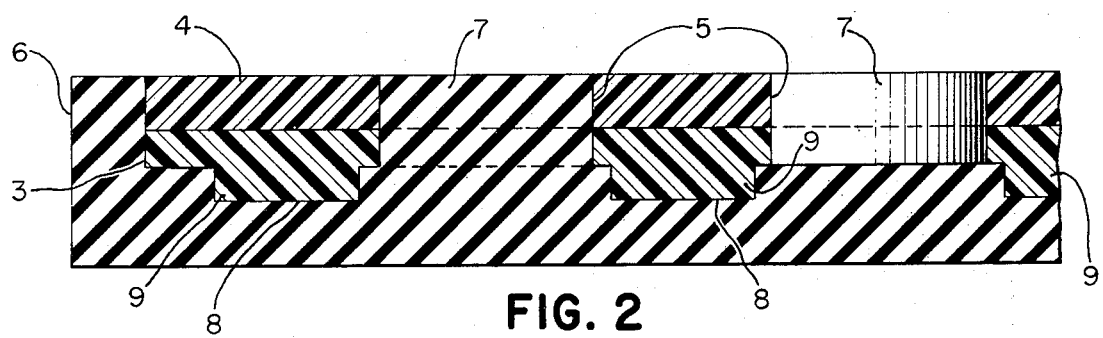
Figure 3:
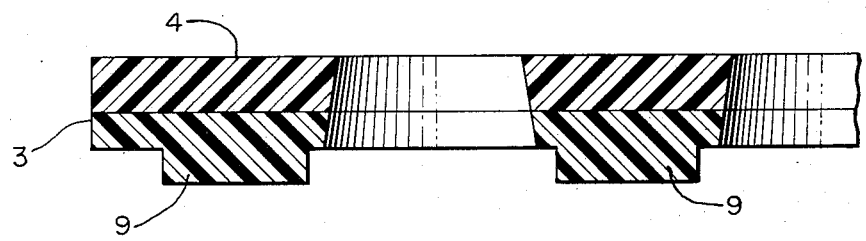

Referring specifically to FIG. 2 it will be noted that the screen member designated by the numeral 3 is a backing or reinforcing member to which is adhered a facing member 4 comprising a polyurethane elastomeric coating or layer thereon and that the coating of the polyurethane elastomer on the backing member is usually approximately three-eighths inch plus or minus an eighth inch. Likewise, the backing member normally will be approximately a quarter inch thick, depending upon the size of the shaker screen and the density of the ores or other material being classified within the shaker. It should be evident from FIG. 2 that hole 5 extends all the way through the facing member or polyurethane elastomeric coating and the backing member. The backing member preferably is formed in mold 6 from liquid or fluid molding ingredients which set or harden to give a backing member of the contour and shape shown in FIG. 2. Then the cover or facing member is formed in the mold by adding sufficient coating ingredients to give a coating or facing member of the desired thickness adhered to the backing member.

Referring again to FIG. 2 the mold 6 is preferably made by pressing an aluminum form into a suitable compounded rubber material such as Neoprene or the diene rubbers to yield the shaped Neoprene or diene rubber mold after it is cured. It is desired that the Neoprene or elastomer of the mold be relatively hard, usually about 40 to 90 Shore A hardness, with the preferred range being greater than 80 and usually essentially plastic in nature, i.e., Shore A hardness greater than 100.

It should be appreciated that the mold can be of any of the well-known materials such as metal, plastic, epoxy, metal-epoxy mixtures, hard rubber, polyethylene, polypropylene, and polyethylene-polypropylene to specifically recite a few of the more common ones. Also, when using these molds, a mold release agent generally will be used as needed. Suitable mold release agents for the various mold materials and molding ingredients are chosen in accordance with the well-known molding practice.

With the backing member formed in the mold as shown in FIG. 2, the facing member can be formed by several methods. Preferred methods are liquid casting or spraying. Alternatively, the facing member can be formed from a polyurethane gum stock suitably compounded for cure and applied as a sheet over the backing member and then be pressed or otherwise adhered to the backing member which has the cylindrical members 7 of the mold projecting upward sufficiently to form holes 5 in the upper member as well as the back member.

Also, the polyurethane elastomeric coating may be applied by spraying or painting a liquid polyurethane reaction mixture or a solvent solution of a cured polyurethane elastomer to the backing member and causing them to react and cure or evaporate and deposit the elastomer on the backing member which has cylindrical members 7 of the mold projecting upward therein.

The holes in the composite of polyurethane elastomer of the upper member and the backing member may be punched or otherwise created in the composite by a suitable pressing or drilling operation. Also, the holes may already be formed in the backing member at the time the upper member of the polyurethane elastomer is applied. In this event it will be necessary to remove the elastomer in the holes in the backing member.

Any of the polyurethane elastomers having a Shore A hardness of about 30 to 90 can be used but the preferred polyurethane elastomer has a Shore A hardness of about 40 to 60. A Shore A hardness in the preferred range wears longer and reduces the strain on the shaker plate where the upper member is 10–40 and preferably 20–30 Shore A hardness units softer than the backing member.

The nature of this invention and its advantages can be more readily understood and appreciated from the following representative examples wherein all parts and percentages are by weight unless otherwise designated.

EXAMPLE I

An aluminum model of the shaker screen was formed. Then the aluminum model was placed in a press containing a compounded sheet of Neoprene rubber and then pressed into the sheet at a pressure of 150 pounds per square inch (p.s.i.) to give a Neoprene mold of the shape shown in FIG. 2 when cured.

The Neoprene was cured for 30 minutes at 300°F. and 150 p.s.i. pressure to give the cured Neoprene mold. The Neoprene mold had a cavity approximately 48 inches by 36 inches on a side with rows of columns 1¼ inches in diameter of Neoprene projecting upward in the cavity with each row of columns being spaced 1¾ inches apart.

The Neoprene mold resting flat on a surface had poured into it a liquid polyurethane reaction mixture which yields a Shore A hardness of about 80 when cured. Sufficient of this Shore A 80 hardness-yielding polyurethane reaction mixture was added to the mold to give a backing member approximately ¼ inch thick and having the dimensions of the mold. After the reaction mixture had reacted sufficiently to permit a second polyurethane reaction mixture to be poured thereon this second polyurethane reaction mixture was poured into the mold to give a layer approximately 3/8 inch thick. This 3/8 inch layer of polyurethane forming the upper facing member was cured to yield a polyurethane having a Shore A hardness of approximately 50. The final composite of polyurethane was cured in the mold at approximately 150°F. overnight to give a cured shaker screen. When the cured composite was removed from the mold, it had rows of holes distributed therein essentially at 1¾ inch distances with the holes therein being approximately 1¼ inches in diameter. It is preferred that the column of Neoprene rubber which projects up in the cavity of the mold taper slightly from their uppermost part to the bottom to facilitate removing the elastomer composite from the mold and also, this produces holes which have a slight taper from the top to the bottom to reduce any tendency of particles passing through the hole binding or plugging the screen. This cured polyurethane composite having the holes as described above was placed in a vibrating shaker and used to satisfactorily size ores and related particles.

EXAMPLE II

The mold of Example I was modified so it had recesses approximately 1 inch wide and ¼ inch thick running longitudinally between each row of cylindrical columns that projected upward in the cavity in the manner best seen in FIG. 2, said recess being indicated by numeral 8. It should be appreciated that when a mold having the recess 8 therein is used to mold a part, the resulting part will have flanges 9 running longitudinally across the shaker screen and between the rows as shown in FIG. 2. A mold of this sort was used to produce a shaker screen according to the technique of Example I and was found to be quite serviceable where extremely high loading or high density ores were being processed.

In an alternate embodiment, instead of using the recesses 8 in the mold, it is possible to use a wire mesh screen with the columns being arranged in the cavity of the mold where they will project upward through the intricacies of the wire mesh screen. It should be appreciated that the wire screen may vary from relatively thin material to those frequently used as reinforcing wires for concrete.

The soft liquid polyurethane reaction mixture that yielded a Shore A 50 hardness polyurethane was made by making a polyurethane prepolymer containing about 4 percent NCO by reacting in an anhydrous condition commercial toluene diisocyanate with a 2,000 molecular weight 80/20 polyethylene propylene adipate. This polyurethane prepolymer (100 parts) was mixed with a mixture of 10 parts hydroxyl ethyl acetate, 5.75 parts of a 500 average molecular weight amine base polypropylene ether tetrol (i.e., a propylene oxide condensed on ethylene diamine), 4.98 parts of methylene bis chloroaniline and 2 parts of a leveling and flow control agent available from Monsanto under the trade name Modific, and 0.12 parts of an organic green dye.

The hard Shore A 80 polyurethane was made from a liquid polyurethane reaction mixture as follows: a prepolymer was formed by the reaction of 100 parts of a blend of 41.32 percent Baker's castor oil, 24.79 percent polybutane diol azelate of molecular weight of 1,000 and 33.6 parts toluene diisocyanate and then 100 parts of this prepolymer was reacted with a mixture comprising 45 parts of hydroxyl ethyl acetate, 22.6 parts methylene dichloroaniline and 40 parts of a mixture of chlorinated phenyl, biphenyl and polyphenyl.

EXAMPLE III

Instead of using the liquid mixtures described in Example I the mold of Example I may be utilized to prepare a shaker screen in accordance with this invention by using a sheet of a commercial sulfur curable polyurethane gum stock.

One hundred parts of a commercial sulfur curable polyurethane gum stock (Elastothane 455) was compounded in a Banbury mill with 20 parts SAF black, 1.0 part of a complex of zinc chloride mercaptobenzothiazole sulfide, 0.5 parts zinc stearate, 4.0 parts mercaptobenzothiazole and 4.0 parts of sulfur.

This compounded sulfur curable polyurethane gum stock was sheeted on a mill to give a sheet approximately ½ inch thick. This sheet is placed on the top side of the clean dry mold and placed in a press. Then a higher sulfur compounded sheet of sulfur curable polyurethane was placed on the first sheet and the two sheets were cured in a press at 350 p.s.i. for 20 minutes at 290°F. to give a composite suitable as a shaker screen.

Instead of Elastothane 455, other gum stocks, including those of the polyetherurethanes, polyesterurethanes and hydrocarbonurethanes, can be used. These gum stocks are available commercially from several companies.

EXAMPLE IV

Another shaker mold was coated with a polyurethane elastomer by casting a layer of a liquid polyurethane reaction mixture thereon and curing.

The liquid polyurethane reaction mixture was made by mixing together the ingredients of Recipe 1 and then casting or pouring it on the mold to a depth of 3/8 inch.

Recipe 1

| | | Parts |
|---|---|---|
| 1 | Prepolymer | 100 |
| 2 | Epon 828 | 4 |
| 3 | Leveling agent, Modiflow | 2 |
| 4 | Hydroxyl ethyl acetate | 10 |
| 5 | Methylene bis orthochloroaniline (MOCA) | 4.98 |
| 6 | Propoxylated ethylene diamine | 5.75 |
| 7 | A green dye | 0.12 |

The prepolymer was prepared by reacting a polyethylene-propylene adipate of about 2,000 molecular weight with sufficient toluene diisocyanate to give a free NCO content of about 3 to 6 percent. Then this prepolymer was mixed with all the other ingredients of the recipe except the MOCA and it was mixed on the Admiral mixer. The resulting mixture was cast on the plate to give a layer 3/8 inch thick and cured at 220°F. for 240 minutes.

This polyurethane covered plate was placed in a shaker screen and run on test screening ores in comparison with a commercial shaker screen. The polyurethane covered plate did not show any sign of deterioration at the time the commercial shaker screen had to be replaced.

Any of the reactive hydrogen containing materials having a molecular weight of 1,000 to 4,000 can be used but commercial availability of these materials at reasonable prices usually result in the use of the polyester polyols or the polyether polyols where the polyols contain 2 but no more than 4 hydroxyls and preferably contain 2 or a mixture of 2 and 3 hydroxyls.

Representative members of the polyester polyols are those obtained by condensation of a glycol of about two to 10 carbon atoms and a dicarboxylic acid of about four to 10 carbon atoms. Representative examples of the normally used polyester polyols preferred in this invention are polyethylene-propylene adipate, polypropylene adipate, polytetramethylene adipate, polytetramethylene azelate, etc.

Representative examples of the many polyether polyols are polypropylene ether glycol and triol, and polytetramethylene ether glycol or triol.

Likewise, any of the organic polyisocyanates can be used in preparation of the polyurethane but for cost and ready commercial availability toluene diisocyanate, methylene di(phenyl isocyanate), hydrogenated methylene di(phenyl isocyanate) and isophorone diisocyanate are used.

The crosslinkers are normally selected from the broad class of diamines including the aliphatic, cycloaliphatic and aromatic ones, and the polyols of less than 800 molecular weight. Representative diamines are those listed in the Kogan, U.S. Pat. No. 3,036,996. Also, the polyols are preferably the glycols of two to 10 carbon atoms.

The soluble polyurethanes, i.e., those soluble in methyl ethyl ketone or dimethylformamide are well known and are available commercially. These materials can be used to build up a coat on the hard backing member by painting or spraying, for instance, to give coats about ¼ inch or thicker on evaporation of the solvent. A representative example of this is the methyl ethyl ketone soluble polyurethane available under the tradename TPU, having numbers such as 123 and 546. These materials are usually polyester or polyether prepolymers of toluene diisocyanate and/or MDI that are cured with butane diol and a small amount of a diamine, for instance, diphenyl sulfone diamine.

With the soluble polyurethanes and the gum stocks, as well as the liquid polyurethane reaction mixtures, it is preferred to treat the surface with an epoxy resin such as Epon 828 to enhance the bond to the metal of the polyurethane. These epoxy resins usually are applied by painting on in a solution of the usual paint thinners or solvent containing an amine, polyamide or acid curative for the epoxy compound.

While certain representative embodiments and details have been shown for the purpose of illustrating the invention, it will be apparent to those skilled in this art that various changes and modifications may be made therein without departing from the spirit or scope of the invention.

What is claimed is:

1. A perforated plate screen having openings therein for sizing particles into the desired size comprising a crosslinked polyurethane backing member having a Shore A hardness of 60 to over 100 and having a covering member of a crosslinked polyurethane of about ⅛ to ⅞ inch thick, said polyurethane covering member having a Shore A hardness of 10 to 40 units less than the backing member.

2. The screen of claim 1 wherein the polyurethane is the reaction product of essentially a polyester polyol having 2 to 3 hydroxyls, an organic polyisocyanate selected from the class of toluene diisocyanate, methylene di(phenylisocyanate), hydrogenated methylene di(phenylisocyanate) and isophorone diisocyanate and a crosslinker selected from the class of diamines and polyols less than 800 in molecular weight.

3. The screen of claim 1 wherein the polyurethane is the reaction product of essentially a polyether polyol having 2 to 3 hydroxyls, an organic polyisocyanate selected from the class of toluene diisocyanate, methylene di(phenylisocyanate), hydrogenated methylene di(phenylisocyanate) and isophorone diisocyanate and a crosslinker selected from the class of diamines and polyols less than 800 in molecular weight.

4. The screen of claim 3 wherein the polyether polyol is selected from the class of polypropylene ether polyols and polytetramethylene ether polyols.

5. The screen of claim 1 wherein between the opening in said member a rib projects downward to reinforce the backing member.

6. The screen of claim 1 having a wire reinforcing member positioned in the backing member.

* * * * *